United States Patent
Son et al.

(10) Patent No.: US 6,611,625 B1
(45) Date of Patent: Aug. 26, 2003

(54) LINEAR DOWN/UPS-SAMPLING APPARATUS AND GENERALIZED SCAN INTERLEAVING-BASED ENCODING/DECODING METHOD AND APPARATUS USING THE SAME

(75) Inventors: Se-hoon Son, Seoul (KR); Dae-sung Cho, Seoul (KR); Jae-seob Shin, Seoul (KR); Yang-seock Seo, Seoul (KR); Dong-ju Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/571,418

(22) Filed: May 15, 2000

(30) Foreign Application Priority Data

Sep. 4, 1999 (KR) ......................................... 1999-37553

(51) Int. Cl.$^7$ ................................................. G06K 9/36
(52) U.S. Cl. ......................................................... 382/238
(58) Field of Search ............................... 382/232, 236, 382/238; 348/388.1, 405.1, 407.1–418.1, 420.1, 422.1, 699, 700; 375/240.03, 240.05, 240.14–240.16, 240.19, 240.24, 240.25

(56) References Cited

U.S. PATENT DOCUMENTS 6,233,017 B1 * 5/2001 Chaddha ...................... 348/412
6,337,881 B1 * 1/2002 Chaddha ................. 375/240.16
6,392,705 B1 * 5/2002 Chaddha .................. 348/388.1

* cited by examiner

*Primary Examiner*—Jose L. Couso
(74) *Attorney, Agent, or Firm*—Burns, Doane, Swecker & Mathis, L.L.P.

(57) ABSTRACT

A generalized scan interleaving-based encoding/decoding method using context values of neighboring pixels and an apparatus therefore, and linear down/up-sampling apparatus used in the apparatus are provided. If the down-sampling ratio is m/n, the linear down-sampling apparatus divides the down-sampling ratio into two parts, $[1/2^K]$ and $[(m2^K)/n]$, and performs linear down-sampling by applying the two parts sequentially. If the up-sampling ratio is n/m, the linear up-sampling apparatus divides the up-sampling ratio into two parts, $[n/(m2^K)]$ and $[2^K]$, and performs linear up-sampling by applying the two parts sequentially. By applying the linear down-sampling and up-sampling method to existing generalized an interleaving-based encoding using context values of neighboring pixels, continuously-scalable down-sampling is enabled and by using the down-sampled base layer, the current layer can be encoded and decoded.

16 Claims, 11 Drawing Sheets

| $I_{left}(I_{upper})$ | $I_{xy}$ | $I_{right}(I_{bottom})$ | G-SI data Type |
|---|---|---|---|
| 1 | 1 | 1 | PSD |
| 1 | 1 | 0 | TSD |
| 0 | 1 | 1 | TSD |
| 0 | 1 | 0 | ESD |
| 1 | 0 | 1 | ESD |
| 1 | 0 | 0 | TSD |
| 0 | 0 | 1 | TSD |
| 0 | 0 | 0 | PSD |

LINEAR DOWN/UPS-SAMPLING APPARATUS AND GENERALIZED SCAN INTERLEAVING-BASED ENCODING/DECODING METHOD AND APPARATUS USING THE SAME

This application claims priority under 35 U.S.C §§119 and/or 365 to 99-37553 filed in Republic of Korea on Sep. 4, 1999; the entire content of which is hereby incorporated by reference.

BACKGROUND OF THE INVENTION

1. Field of the Invention

The present invention relates to a scalable binary shape encoding/decoding method, and more particularly, to a generalized scan interleaving-based encoding/decoding method using context values of neighboring pixels and an apparatus therefor, and to a linear down/up-sampling apparatus used in the encoding/decoding apparatus.

2. Description of the Related Art

Conventional scan interleaving-based encoding methods using context values of neighboring pixels have a limitation in that only a lower layer which is half the length of, and half the width of a current layer can be used.

SUMMARY OF THE INVENTION

To solve the above problem, it is an objective of the present invention to provide a generalized scan interleaving-based encoding/decoding method, which uses context values of neighboring pixels and can use a lower layer which is scaled-down in an arbitrary ratio.

To solve the above problem, it is another objective of the present invention to provide a generalized scan interleaving-based encoding/decoding apparatus, which uses context values of neighboring pixels and can use a lower layer which is scaled-down in an arbitrary ratio.

To solve the above problem, it is still another objective of the present invention to provide a linear down/up-sampling apparatus used in the above encoding/decoding apparatus.

To accomplish the above object of the present invention, there is provided a generalized scan interleaving-based encoding method using context values of neighboring pixels, for encoding pixels which were not sampled during down-sampling, after down-sampling pixels of a current layer in the sampling ratio of m/n in the vertical direction and m'/n' in the horizontal direction when input shape information are pixels of the current layer, in which m, n and m', n' are arbitrary integers (zero is forbidden), and m<=n and m'<=n', the scan interleaving-based method having the steps of (a) forming a bit stream of a base layer by. encoding, through a predetermined encoding method, the base layer pixels which were down-sampled from the current layer pixels through $2^K$ down-sampling and residual down-sampling in the vertical direction and the horizontal direction, respectively, in which the exponent K satisfies. K=0, 1, 2, . . . ; (b) dividing the current layer pixels into units of a predetermined block; (c) forming bit streams for all blocks of the current layer, by sequentially carrying out forming steps for pixels forming each block of the current layer, the forming steps having the steps of (c1) encoding pixels, which were not sampled when vertical-direction $2^L$ down-sampling was L-times recursively carried out in the step (a), using context values of neighboring pixels, in which L is the largest integer less than or equal to $\log_2(n/m)$, (c2) encoding pixels, which were not sampled during residual down-sampling in the ratio of $[(m2^L)/n]$ in the vertical direction, using context values of neighboring pixels, (c3) encoding pixels, which were not sampled when horizontal-direction $2^K$ down-sampling was K-times recursively carried out in the step (a), using context values of neighboring pixels, in which K is the largest integer less than or equal to $\log_2(n'/m')$, (c4) encoding pixels, which were not sampled during residual down-sampling in the ratio of $[(m'2^K)/n']$ in the horizontal direction in the step (a), using context values of neighboring pixels, (c5) forming blocks of encoded bit streams by the block by arraying the bit streams encoded in the steps (c1), (c2), (c3), and (c4) in the order of steps (c4), (c3), (c2) and (c1); and (D) forming scalable bit streams by arraying bit streams of the current layer after the bit streams of the base layer.

Preferably, in the scan interleaving-based encoding method, the vertical-direction $2^L$ down-sampling is for sampling even numbered lines in the lines of pixels; the horizontal-direction $2^K$ down-sampling is for sampling even numbered columns in the columns of pixels; the residual down-sampling in the ratio of $[(m2^L)/n]$ in the vertical direction is for sampling $m2^L$ lines of n lines of pixels so that lines which are not sampled are allocated evenly and after the lines the sampled lines are located; and the residual down-sampling in the ratio of $[(m'2^K)/n']$ in the horizontal direction is for sampling $m'2^K$ columns of every n' columns of pixels so that columns which are not sampled are allocated evenly and after the columns the sampled columns are located.

Preferably in the scan interleaving-based encoding method, the vertical-direction $2^L$ down-sampling is for sampling odd numbered lines in the lines of pixels; the horizontal-direction $2^K$ down-sampling is for sampling odd numbered columns in the columns of pixels; the residual down-sampling in the ratio of $[(m2^L)/n]$ in the vertical direction is for sampling $m2^L$ lines of every n lines of pixels so that lines which are not sampled are allocated evenly and before the lines the sampled lines are located; and, the residual down-sampling in the ratio of $[(m'2^K)/n']$ in horizontal direction is to sample $m'2^K$ columns per n' columns in the columns of pixels so that columns which are not sampled are allocated evenly and before the columns sampled columns are located.

It is preferred that, before the step (c1), the scan interleaving-based encoding method further has a step of performing binary arithmetic encoding of block encoding types after determining the block encoding types by determining an Exceptional Sample Data Block (ESD-B) in which, in pixel encoding through horizontal-direction scanning for each pixel to be decoded, excluding pixels of the base layer, in pixels forming the blocks, there exist one or more exceptional pixels that is not the same as one of a reference pixel which is located nearest to and above the current pixel to be decoded and a reference pixel which is located nearest to and below the current pixel when the reference pixels are the same, or, in pixel encoding through vertical-direction scanning, there exists one, or more pixels that is not the same as one of a reference pixel which located nearest to and to the left of the current pixel and a reference pixel which is located nearest to and to the right of the current pixel when the reference pixels are the same, or otherwise determining the Transitional Sample Data Block (TSD-B), in which the binary arithmetic encoded block encoding type is located in the front of the bit stream encoded by the block formed in the step (c5).

Preferably in the scan interleaving-based encoding method, the generalized scan interleaving-based encoding using context values of neighboring pixels is for performing arithmetic encoding of all pixels to be decoded in the block using neighboring pixels if the block encoding type is an exceptional block; and if the block encoding type is a transitional block, the generalized scan interleaving-based encoding using context values of neighboring pixels is not encoding Predictive Sample Data (PSD) pixels, each of which, in pixel encoding through horizontal direction generalized scanning for each pixel to be decoded in the block, is the same as both a reference pixel which is located nearest to and above the current pixel to be decoded and a reference pixel which is located nearest to and below the current pixel when the reference pixels are the same, or, each of which, in pixel encoding through vertical direction generalized scanning for each pixel to be decoded in the block, is the same as both a reference pixel which is located nearest to and to the left of the current pixel and a reference pixel which is located nearest to and to the right of the current pixel when the reference pixels are the same, and, for otherwise pixels, that is, TSD pixels, the generalized scan interleaving-based encoding is to perform arithmetic encoding of TSD pixels using neighboring pixels.

Preferably in the generalized scan interleaving-based encoding method, the arithmetic encoding using neighboring pixels is for performing arithmetic encoding of probability values corresponding to context values after obtaining context values by using neighboring pixels which are fully encoded, including, in pixel encoding through vertical-direction generalized scanning, a pixel which is located immediately above and to the left of a current pixel to be encoded, a pixel which is located immediately above of the current pixel, a pixel which is located immediately above and to the right of the current pixel, a pixel which is located immediately to the left of the current pixel, a pixel which is located immediately to the right of the current pixel, a pixel which is located immediately below and to the left of the current pixel, and a pixel which is located immediately to the right below of the current pixel, or, including, in pixel encoding through horizontal direction generalized scanning, a pixel which is located immediately above and to the left of a current pixel to be encoded, a pixel which is located immediately above the current pixel, a pixel which is located immediately above and to the right of the current pixel, a pixel which is located immediately to the left of the current pixel, a pixel which is located immediately below and to the left below of the current pixel, a pixel which is located immediately below the current pixel, and a pixel which is located immediately below and to the right of the current pixel.

Preferably, the generalized scan interleaving encoding method is recursively used in a predetermined method for encoding the base layer pixels in the step (a).

To accomplish the above object of the present invention, there is provided a generalized scan interleaving-based decoding method using context values of neighboring pixels, the generalized scan interleaving-based decoding method using bit streams of a base layer which is obtained by encoding the base layer obtained by down-sampling pixels of the current layer in the sampling ratio of m/n in the vertical direction and m'/n' in the horizontal direction, and bit streams of the current layer which is obtained by encoding pixels, not sampled during down-sampling, in units of a block, when input shape information are pixels of the current layer, in which m, n, m', n' are arbitrary integers (zero is forbidden), and m<=n, m'<=n', the generalized scan interleaving-based method having the steps of (a) decoding the base layer pixels by a predetermined method which uses the base layer bit streams (b) performing horizontal-direction residual up-sampling, horizontal-direction $2^K$ up-sampling, vertical-direction residual up-sampling, and vertical-direction $2^K$ up-sampling of the base layer pixels in the step (a) in order for the base layer pixels to have the same spatial resolution as the current layer, in which the exponent K satisfies K=0.1, 2, . . . ; (c) dividing the current layer pixels up-sampled in the step (b) into units of a predetermined block; and (d) decoding all blocks of the current layer, by sequentially carrying out decoding steps which include (d1) decoding in units of a block pixels interpolated during horizontal-direction up-sampling in the ratio of $[n'/m'2^K)]$ by applying generalized scan interleaving-based decoding using context values of neighboring pixels to the current layer bit streams corresponding to the block, in which K is the largest integer less than or equal to $\log_2(n'/m')$, (d2) decoding pixels, which were interpolated when horizontal-direction $2^K$ up-sampling was K-times recursively carried out, by K times recursively applying generalized scan interleaving-based decoding using context values of neighboring pixels by the block to the current layer bit streams corresponding to the block, (d3) decoding in units of a block pixels interpolated during vertical-direction residual up-sampling in the ratio of $[n/(m2^L)]$ by applying generalized scan interleaving-based decoding using context values of neighboring pixels to the current layer bit streams corresponding to the block, in which L is the largest integer less than or equal to $\log_2(n/m)$, and (d4) decoding pixels, which were interpolated when vertical-direction $2^L$ up-sampling was L-times recursively carried out, by L times recursively applying generalized scan interleaving-based decoding using context values of neighboring pixels by the block to the current layer bit streams corresponding to the block.

Preferably in the generalized scan interleaving-based decoding method, the vertical-direction residual up-sampling in the ratio of $[n/(m2^L)]$ is for interpolating one line for every $(m2^L)/(n-m2^L)$th line so that interpolated lines are allocated evenly and located before existing lines; the horizontal-direction residual up-sampling in the ratio of $[n'/(m'2^K)]$ is for interpolating one column for every $(m2^K)/(n-m2^K)$th column so that interpolated columns are allocated evenly and located before existing columns; the vertical-direction $2^L$ up-sampling is for interpolating one line before each line of pixels; and the horizontal-direction $2^K$ up-sampling is for interpolating one column before each column of pixels.

Preferably in the generalized scan interleaving-based decoding method, the vertical-direction residual up-sampling in the ratio of $[n/(m2^L)]$ is for interpolating one line for every $(m2^L)/(n-m2^L)$th line so that interpolated lines are allocated evenly and located after existing lines; the horizontal-direction residual up-sampling in the ratio of $[n'/(m'2^K)]$ is for interpolating one column for every $(m2^K)/(n-m2^K)$th column so that interpolated columns are allocated evenly and located after existing columns; the vertical-direction $2^L$ up-sampling is for interpolating one line after each line of pixels; and the horizontal-direction $2^K$ up-sampling is for interpolating one column after each column of pixels.

It is preferable that the generalized scan interleaving-based decoding method further has a step for performing binary arithmetic decoding of block encoding types which represent an Exceptional Sample Data Block (ESD-B) in which, in pixel decoding through horizontal-direction generalized scanning for each pixel to be decoded, excluding pixels of the base layer, in pixels forming the block, there exist one or more exceptional pixels that is not the same as one of a reference pixel which is located immediately above the current pixel to be decoded and a reference pixel which is located immediately below the current pixel when the reference pixels are the same, or in pixel decoding through vertical-direction generalized scanning, there exists one or more pixels that is not the same as one of a reference pixel which is located immediately to the left of the current pixel and a reference pixel which is located immediately to the right of the current pixel when the reference pixels are the same, and Transitional Sample Data Block (TSD-B) for otherwise blocks.

Preferably in the generalized scan interleaving-based decoding method, the generalized scan interleaving-based decoding using context values of neighboring pixels is for performing arithmetic decoding of all pixels to be decoded in the block using neighboring pixels if the block encoding type is ESD-B; and if the block encoding type is TSD-B, the generalized scan interleaving-based decoding using context values of neighboring pixels is to restore pixels to be decoded to the same values to reference values for Predictive Sample Data (PSD) pixels, each of which, in pixel decoding through horizontal-direction generalized scanning for each pixel to be decoded in the block, is the same as both a reference pixel which is located immediately above the current pixel to be decoded and a reference pixel which is located immediately below the current pixel when the reference pixels are the same, or, each of which, in pixel decoding through vertical-direction generalized scanning for each pixel to be decoded in the block, is the same as both a reference pixel which is located immediately to the left of the current pixel and a reference pixel which is located immediately to the right of the current pixel when the reference pixels are the same, and, for otherwise pixels, that is, TSD pixels, the generalized scan interleaving-based decoding is to perform arithmetic decoding using neighboring pixels.

Preferably in the generalized scan interleaving-based decoding method, the arithmetic decoding using neighboring pixels is for performing arithmetic decoding by obtaining probability values corresponding to context values after obtaining context values by using neighboring pixels which are fully decoded, including, in pixel decoding through vertical-direction generalized scanning, a pixel which is located immediately above and to the left of a current pixel to be decoded, a pixel which is located immediately above of the current pixel, a pixel which is located immediately above and to the right of the current pixel, a pixel which is located immediately to the left of the current pixel, a pixel which is located immediately to the right of the current pixel, a pixel which is located immediately below and to the left of the current pixel, and a pixel which is located immediately below and to the right of the current pixel, or, including, in pixel decoding through horizontal-direction generalized scanning, a pixel which is located immediately above and to the left of a current pixel to be decoded, a pixel which is located immediately above of the current pixel, a pixel which is located immediately above and to the right above of the current pixel, a pixel which is located immediately to the left of the current pixel, a pixel which is located immediately below and to the left of the current pixel, a pixel which is located immediately below of the current pixel, and a pixel which is located immediately below and to the right below of the current pixel.

Preferably in the generalized scan interleaving-based decoding method, the decoded current layer is used as a base layer in the step (a) and steps (b) through (c) are recursively performed.

To accomplish the above object of the present invention, there is provided a generalized scan interleaving-based encoding apparatus using generalized context values of neighboring pixels, for encoding pixel, which were not sampled during down-sampling for obtaining a base layer, among pixels of blocks which are prepared by dividing a current layer into a plurality of blocks in encoding of a current layer, after down-sampling pixels of the current layer in the sampling ratio of m/n in the vertical direction and m'/n' in the horizontal direction when input shape information are pixels of the current layer, in which m, n, m', n' are arbitrary integers (zero is forbidden), and m<=n, m'<=n', the generalized scan interleaving-based encoding method having down-sampling means for performing vertical-direction $2^K$ down-sampling, vertical-direction residual down-sampling, horizontal-direction $2^K$ down-sampling and horizontal-direction residual down-sampling of the current layer pixels, in which the exponent K satisfies K=0, 1, 2, . . . ; encoding means for encoding the base layer pixels down-sampled in the down-sampling means; a block-dividing unit for dividing the current layer pixels into units of a predetermined block; vertical-direction $2^L$ encoding means for receiving divided blocks from the block-dividing unit, and performing generalized scan interleaving-based encoding of pixel, which were not sampled when vertical-direction $2^L$ down-sampling processes L-times recursively carried out in the down-sampling means, among received block pixels, using context values of neighboring pixels, in which L is the largest integer less than or equal to $\log_2(n/m)$; vertical-direction residual encoding means for receiving divided blocks from the block-dividing unit, and performing generalized scan interleaving-based encoding of pixels, which were not sampled during residual down-sampling in the ratio of $[(m2^L)/n]$ in the vertical direction in the down-sampling means, among received block pixels, using context values of neighboring pixels; horizontal-direction $2^K$ encoding means for receiving divided blocks from the block-dividing unit, and performing generalized scan interleaving-based encoding of pixel, which were not sampled when horizontal-direction $2^K$ down-sampling is K-times recursively carried out in the down-sampling means among received block pixels, using context values of neighboring pixels, in which K is the largest integer less than or equal to $\log_2(n'/m')$; horizontal-direction residual encoding means for receiving divided blocks from the block-dividing unit, and performing generalized scan interleaving-based encoding of pixel, which were not sampled during residual down-sampling in the ratio of $[(m'2^K)/n']$ in the horizontal direction in the down-sampling means, among received block pixels, using context values of neighboring pixels; and a multiplexing unit for forming bit streams of the base layer after receiving bit streams from the base layer encoding means; forming bits streams in order of the horizontal-direction residual encoding means, the horizontal-direction $2^K$ encoding means, the vertical-direction residual encoding manes, and the vertical-direction $2^L$ encoding means; forming bit streams of the current layer after receiving unit block bit streams as much as the number of blocks; and connecting the current bit streams to the back of the base layer bit streams and transferring the bit streams.

To accomplish the above object of the present invention, there is provided a generalized scan interleaving-based decoding apparatus using generalized context values of neighboring pixels, for decoding pixel which were not sampled during down-sampling for obtaining a base layer, among pixels of block which are prepared by dividing a current layer into a plurality of blocks in encoding of a current layer, after down-sampling pixels of the current layer in the sampling ratio of m/n in the vertical direction and m'/n' in the horizontal direction when input shape information are pixels of the current layer, in which m, n, m', n' are arbitrary integers (zero is forbidden), and m<=n, m'<=n', having base layer decoding means for decoding the base layer pixels by using the base layer bit streams; up-sampling means for performing horizontal-direction residual up-sampling, horizontal-direction $2^K$ up-sampling, vertical-direction residual up-sampling, and vertical-direction $2^K$ up-sampling in order to provide base layer pixels with the same spatial resolution as the current layer, in which the exponent K satisfies K=0, 1, 2, . . . ; horizontal-direction residual decoding means for locating values decoded through generalized scan interleaving using the current layer bit streams and context values of neighboring pixels in the place where interpolated pixels are located, when horizontal-direction residual up-sampling of the base layer pixels is carried out in the ratio of $[n'/(m'2^K)]$, in which K is the largest integer less than or equal to $\log_2(n'/m')$; horizontal-direction $2^K$ decoding means for locating values decoded through generalized scan interleaving using the current layer bit steams and context values of neighboring pixels on the place where interpolated pixels are located, when horizontal-direction $2^K$ up-sampling of the base layer pixels which were residual up-sampled in the horizontal direction is carried out K times recursively; vertical-direction residual decoding means for locating values decoded through generalized scan interleaving using the current layer bit streams and context values of neighboring pixels in the place where interpolated pixels are located, when $[n/(m2^L)]$ times vertical-direction residual up-sampling of the base layer pixels which were $2^K$ up-sampled in horizontal direction is carried out, in which L is the largest integer less than or equal to $\log_2(n/m)$; and vertical-direction $2^L$ decoding means for locating values decoded through generalized scan interleaving using the current layer bit streams and context values of neighboring pixels on the place where interpolated pixels are located when vertical-direction $2^L$ up-sampling of the base layer pixels which were residual up-sampled in vertical direction is carried out L times recursively.

To accomplish the above object of the present invention, there is provided a down-sampling apparatus for down-sampling input data in the ratio of m/n, in which m and n are arbitrary integers (zero is forbidden) which satisfy m≦n, the down-sampling apparatus having $2^K$ down-sampling means for sampling one data in every $2^K$ data among input data, in which K is the largest integer less than or equal to $\log_2(n/m)$; and residual down-sampling means for sampling one data in every $\{n/(m2^K)]$ data among the data sampled in the $2^K$ down-sampling means.

Preferably in the down-sampling apparatus, the $2^K$ down-sampling means samples one data located in the last of every $2^K$ data; and the residual down-sampling means samples $(m2^L)$ data in every n data so that data which were not sampled are allocated evenly and after the data the sampled data are located.

Preferably in the down-sampling apparatus, the $2^K$ down-sampling means samples one data located in the front of every $2^K$ data; and the residual down-sampling means samples $(m2^L)$ data in every n data so that data which were not sampled are allocated evenly and before the data the sampled data are located.

To accomplish the above object of the present invention, there is provided an up-sampling apparatus for up-sampling input data in the ratio of n/m, in which m, n are arbitrary integers (zero is forbidden) which satisfy m≦n, having a residual up-sampling unit for interpolating $[n-m2^K]$ data in every $m2^K$ data among input data, in which K is the largest integer less than or equal to $\log_2(n/m)$; and a $2^K$ up-sampling unit for interpolating $(2^K-1)$ data for each data of the data interpolated in the residual up-sampling unit.

Preferably in the up-sampling apparatus, the residual up-sampling unit interpolates $[n-m2^K]$ data for every $m2^K$ data so that interpolated data are allocated evenly and each interpolated data has the same value as that of data which is located immediately after the interpolated data; and before each interpolated data the $2^K$ up-sampling unit interpolates $(2^K-1)$ data that have the same value as the data.

Preferably in the up-sampling, apparatus, the residual up-sampling unit interpolates $[n-m2^K]$ data for every $m2^K$ data so that interpolated data are allocated evenly and each interpolated data has the same value as that of data which is located immediately before the interpolated data; and after each interpolated data the $2^K$ up-sampling unit interpolates $(2^K-1)$ data that have the same value as the data.

BRIEF DESCRIPTION OF THE DRAWINGS

The above objectives and advantages of the present invention will become more apparent by describing in detail a preferred embodiment thereof with reference to the attached drawings in which:

FIG. 4b illustrates a pixel decoding order of a certain block

FIG. 9c illustrates the types of pixels to be decoded, according to the types of reference pixels of FIGS. 9a and 9b.

DETAILED DESCRIPTION OF THE INVENTION

A preferred embodiment of the present invention will be described below with reference to the accompanying drawings. The present invention allows encoding/decoding of a current layer using a lower layer which is continuously scalable, thus removing the limitation of a conventional binary shape information encoder using scan interleaving (hereinafter referred to as SI), in which only a lower layer which is half the width and half the length of the current layer must be used. To achieve this, first, the present invention provides a down-sampling method for continuously scaling-down, including the method for having the width and having the length, and an apparatus therefor, and an up-sampling method for scaling-up in an arbitrary ratio, including a method for doubling the width and doubling the length, and an apparatus therefor.

Figure 1A:
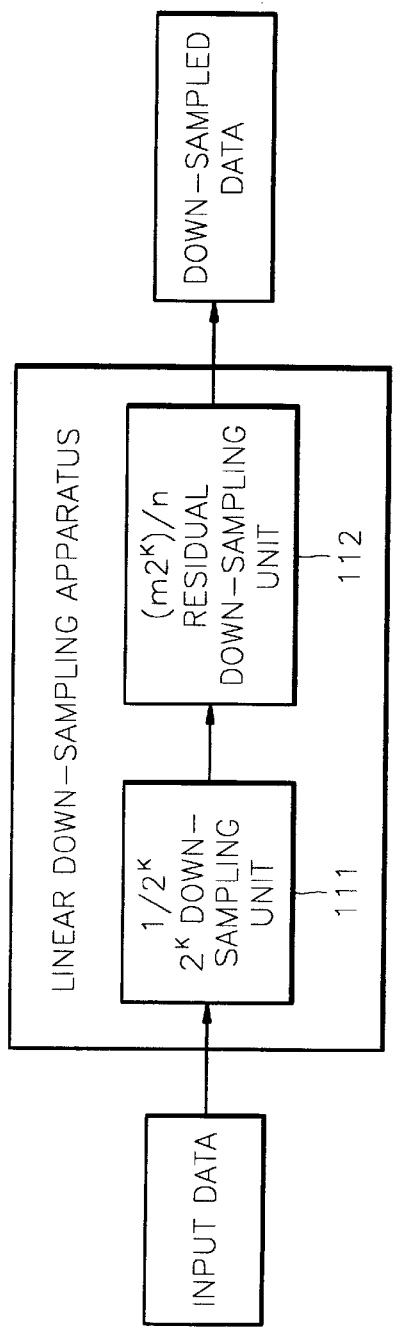
FIGS. 1a and 1b are block diagrams showing linear down-sampling apparatus and up-sampling apparatus, respectively, for generalized scan interleaving-based encoding/decoding using context values of neighboring pixels.
Figure 1B:
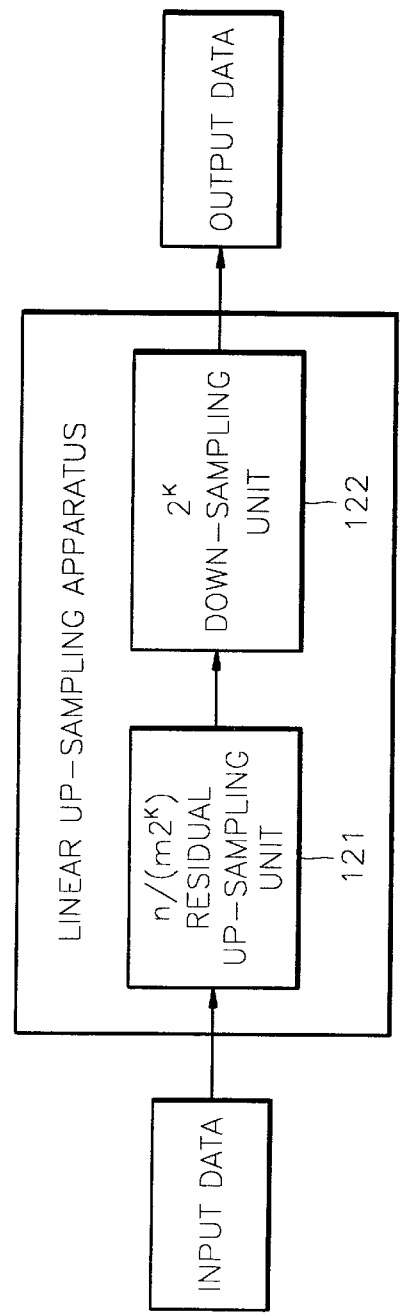

FIGS. 1a and 1b are block diagrams showing a linear down-sampling apparatus and a linear up-sampling apparatus, respectively, for generalized scan interleaving (hereinafter referred as G-SI) according to the present invention. Since the linear down-sampling apparatus and the linear up-sampling apparatus according to the present invention operate according to a linear sampling method, pixels removed during down-sampling can be accurately restored to their original places during up-sampling.

First, referring to FIG. 1a, the down-sampling apparatus according to the present invention includes a $2^k$ down-sampling unit 111 (here, k=0, 1, 2, . . . ) and a residual down-sampling unit 112. That is, when a given scale-down ratio is m/n, the scale-down ratio is divided into two parts, $[1/2^k]$ and $[(m2^k)/n]$, and linear down-sampling in which the two divided parts are sequentially applied is carried out. Pixels which were not sampled during the down-sampling are encoded in a binary shape encoder and, later, are accurately restored to their original values and the original positions. The detailed process of the linear down-sampling method according to the present invention will now be described.

---

<A down-sampling algorithm of a $1^{st}$ method>
If a down-sampling ratio is m/n,
   m/n = $[1/2^K][(m2^K)/n]$, K = floor($\log_2$(n/m))
[1] K is calculated to satisfy K = floor($\log_2$(n/m)).
[2] One data is sampled among $2^K$ data.
   If(x%$2^K$ == ($2^K$ – 1)), then data in position x is sampled.
   Here, x is an integer representing the position of current data.
   (x = 0, . . . , number of input data –1)
[3] One pixel is sampled in n/(m$2^K$) data from the result of step [2].
   if i represents an integer which is 1 or more, y represents an integer which satisfies (y = 0, . . . , number of result data of [2] – 1), and α[p] represents the largest integer less than p,
   for(y = 0; y< number of result data of [2]; y = y + 1) {
      If(y == α [i · n/(m$2^K$)]) {
         Data is sampled at position y;
         i = i + 1;
      }
   }
<A down-sampling algorithm of a $2^{nd}$ method>
If a down-sampling ratio is m/n,
   m/n = $[1/2^K][(m2^K)/n]$, K = floor($\log_2$(n/m))
[1] K is calculate to satisfy K = floor($\log_2$(n/m)).
[2] One data is sampled among $2^K$, data.
   If(x%$2^K$ == 0), then data in position x is sampled.
   Here, x is an integer representing the position of current data.
   (x = 0, . . . , number of input data –1)
[3] One pixel is sampled in n/(m$2^K$) data from the result of step [2].
   If i represents an integer which is 1 or more, y represents an integer which satisfies (y =0, . . . , number of result data of [2] –1), and β[p] represents the largest integer less than or equal to p,
   for(y = 0; y< the number of result data of [2]; y = y + 1) {
      If(y == β[i · n/(m$2^K$)]) {
         Data is sampled at position y;
         i = i + 1;
      }
   }

---

Here, floor(a) represents an integer less than or equal to a, and % represents modular arithmetic. At this time, since $[(m2^K)/n]$ is a larger number than 1/2, neighboring pixels for scan interleaving-based encoding of pixels which are not sampled always exist. The linear down-sampling algorithm of the $1^{st}$ method is a method in which the last value is sampled in a predetermined sampling space, while the linear down-sampling algorithm of the $2^{nd}$ method is a method in which the first value is sampled in a predetermined sampling space.

Figure 2A:
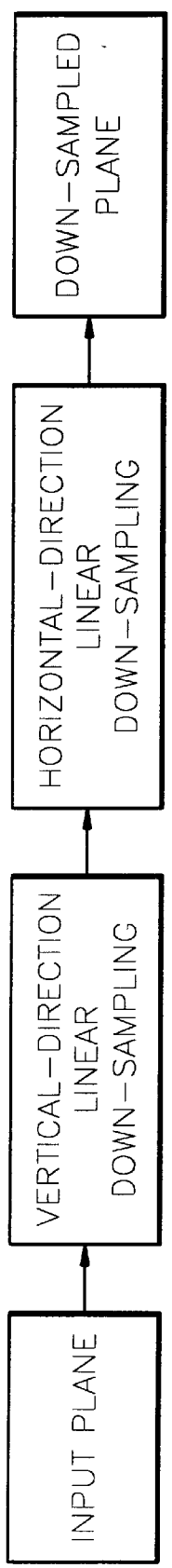
FIGS. 2a and 2b illustrates down-sampling and up-sampling methods, respectively, in which the sampling methods for generalized scan interleaving-based encoding/decoding using context values of neighboring pixels are applied to two-dimensional planes.

Referring to FIG. 2a, linear down-sampling of a two-dimensional plane can be carried out by applying the one-dimensional linear down-sampling method described above sequentially in the vertical direction and the horizontal direction.

Figure 2B:
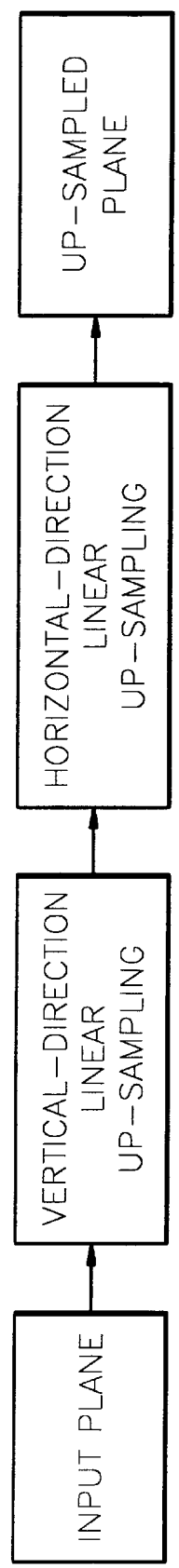

Referring to FIG. 2b, the up-sampling apparatus according to the present invention carries out a reversed process, accurately places the pixels, which were down-sampled during down-sampling, in their original positions, and interpolates the pixels, which were not down-sampled during down-sampling, using the down-sampled pixels. Such linear up-sampling apparatus includes a residual up-sampling unit 121 and a $2^k$ up-sampling unit 122 (here, k=0, 1, 2, . . . ). That is, when a given scale-up ratio is n/m, the scale-up ratio is divided into two parts, $[n/(m2^k)]$ and $[2^k]$, and linear up-sampling in which the two divided parts are sequentially applied is carried out. The detailed process of the linear up-sampling method according to the present invention will now be described.

---

<An up-sampling algorithm of a $1^{st}$ method>
If an up-sampling ratio is n/m,
   n/m = $[n/(m2^K)][2^K]$, K = floor($\log_2$(n/m))
[1] K is calculated that satisfies K = floor($\log_2$(n/m)).
[2] A data is interpolated at each of (m$2^K$)/(n-m$2^K$)th data.
   i = 0
   for(x=0; x < number of input data; x = x + 1) {
      if(x == floor[i · (m$2^K$)/(n-m$2^K$)]) {
         A pixel having the same value as position x is interpolated before the position x
         i++;
      }
   }
[3] $2^K$–1 pixels are interpolated for every data from the result of [2]:
   In front of each data obtained from the result of [2], interpolation is carried out by $2^K$–1 times repeating data having the same value.
<An up-sampling algorithm of a $2^{nd}$ method>
If an up-sampling ratio is n/m,
   n/m = $[n/(m2^K)][2^K]$, K = floor($\log_2$(n/m))
[1] K is calculate to satisfy K = floor($\log_2$(n/m)).
[2] A data is interpolated at each of (m$2^K$)/(n-m$2^K$)th data.
   i = 0
   for(x = 0; x < number of input data; x = x + 1) {
      if(x == floor[i · (m$2^K$)/(-m$2^K$)]) {
         A pixel having the same value as position x is interpolated after the position x.
         i++.
      }
   }
[3] $2^K$–1 pixels are interpolated for every data from the result of [2]:
   At the back of each data obtained from the result of [2], interpolation is carried out by $2^K$–1 times repeating data having the same value.

---

In order to make the position of each pixel accurately correspond to the original position after up-sampling, the linear up-sampling algorithms of the $1^{st}$ method and the $2^{nd}$ method must be used in conjunction with the linear down-sampling algorithms of the $1^{st}$ method and the $2^{nd}$ method. respectively.

Referring to FIG. 2b, a linear up-sampling of a two-dimensional plane can be carried out by applying the one-dimensional linear up-sampling method sequentially in the vertical direction and the horizontal direction.

Figure 3:
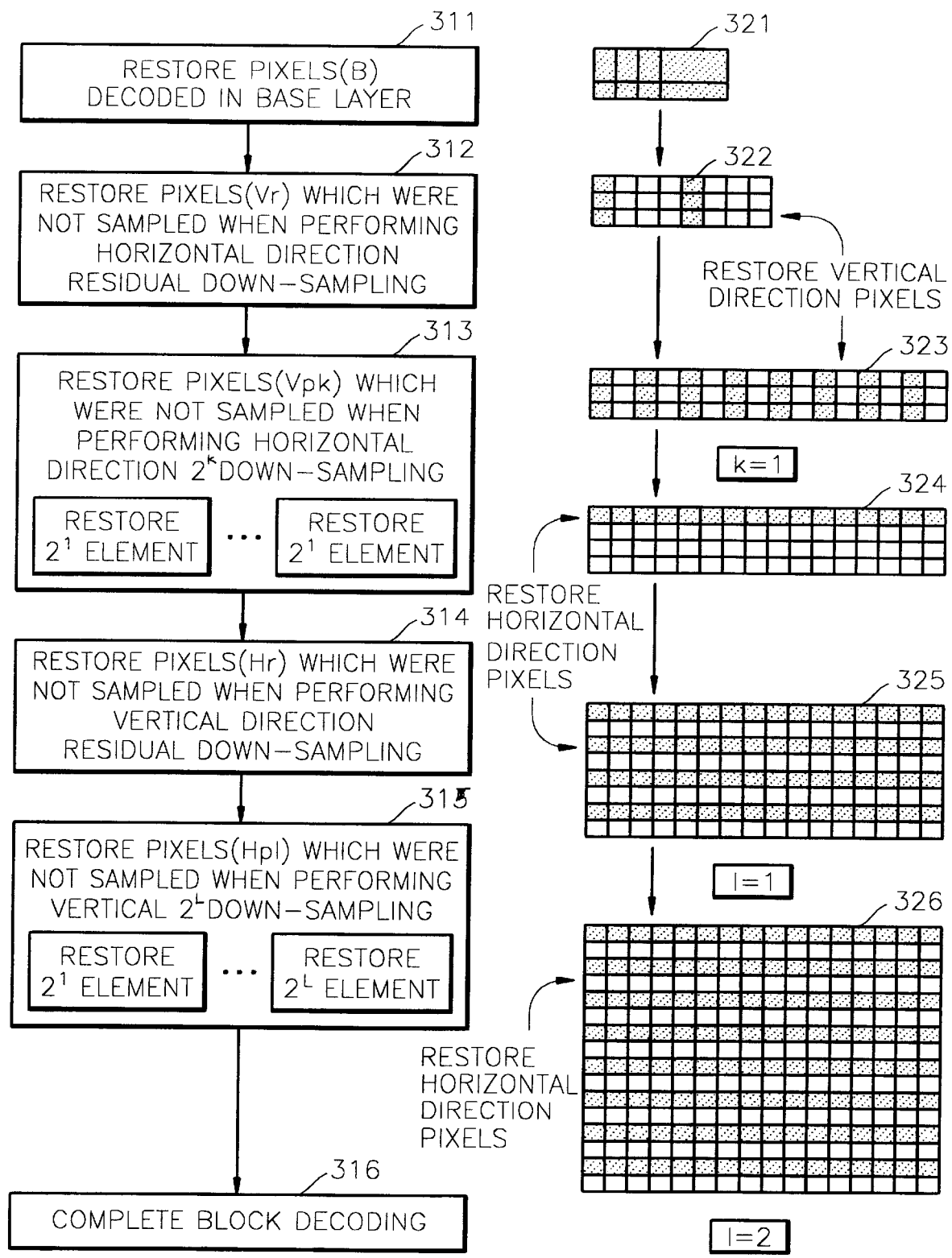
FIG. 3 illustrates a pixel decoding procedure in a generalized scan interleaving-based encoding/decoding method using context values of neighboring pixels.

FIG. 3 illustrates a pixel decoding procedure in a generalized scan interleaving-based decoding method using context values of neighboring pixels according to the present invention.

First, the pixels which were encoded after being down-sampled in a base layer are decoded in step 311. Then, decoded pixels (B) are used in restoring the original image having the original spatial resolution. The information having the original horizontal-direction spatial resolution is restored through a pixel restoring process which uses a vertical scanning method based on the base layer information. At this time, first, using already decoded pixels (B) and bit streams encoded in the encoder, the pixels ($V_r$) which were not sampled during the residual down-sampling process in horizontal-direction down-sampling to obtain the base layer are restored in step 312. Next, using already decoded pixels (B, $V_r$) and bit streams encoded in the encoder, the pixels ($V_{pk}$) which were not sampled during the $2^k$ down-sampling process in horizontal-direction down-sampling are restored in step 313. In the step 313, a scan interleaving-based method in which, referring to left and right pixel columns, one vertical column is restored and inserted between each vertical pixel column of the information resulting from the step 312, is used. That is, if the exponent of 2 is K in the step 313, the information having the original horizontal resolution can be restored, by K times-recursively using a scan interleaving-based method which doubles horizontal resolution.

When vertical-direction spatial resolution is restored using this result, original shape information having the final and original spatial resolution is obtained. In order to restore vertical-direction spatial resolution, horizontal-direction spatial resolution can be restored to the original information through a pixel restoring process using a horizontal scanning method based on the information resulting from the step 313. At this time, first, using already decoded pixels (B, $V_r$, $V_{pk}$) and bit streams encoded in the encoder, the pixels ($H_r$) which were not sampled during the residual down-sampling process in vertical-direction down-sampling to obtain the base layer are restored in step 314. Next, the pixels ($H_{pl}$) which were not sampled during the $2^k$ down-sampling process in vertical-direction down-sampling are restored in step 315. In the step 315, the scan interleaving-based method in which, referring to above and below pixel lines, one horizontal line is restored and inserted between each horizontal pixel column of the information resulting from the step 314, is used. That is, if the exponent of 2 is L in the step 315, the information having the original vertical resolution can be restored, by L times-recursively using a scan interleaving-based method which doubles vertical resolution. By sequentially applying spatial resolution restoration through restoring pixel values in the horizontal direction and the vertical direction, the original shape information having the original resolution is restored finally in step 316.

Reference numerals 321 through 326 of FIG. 3 illustrate the processes corresponding to the reference numerals 311 through 316, respectively. Dark pixel parts in the reference numerals 321 through 326 represent pixels which are being newly restored. In the reference numerals of FIG. 3, the horizontal-direction sampling ratio is 3/8 and the vertical-direction sampling ratio is 1/5. Therefore, the horizontal-direction exponent of two K is K=floor($\log_2(8/3)$)=1, and the vertical-direction exponent of two L is L=floor($\log_2(5/1)$)=2. Also, it is assumed that the algorithm of the $1^{st}$ method is used.

Figure 4A:
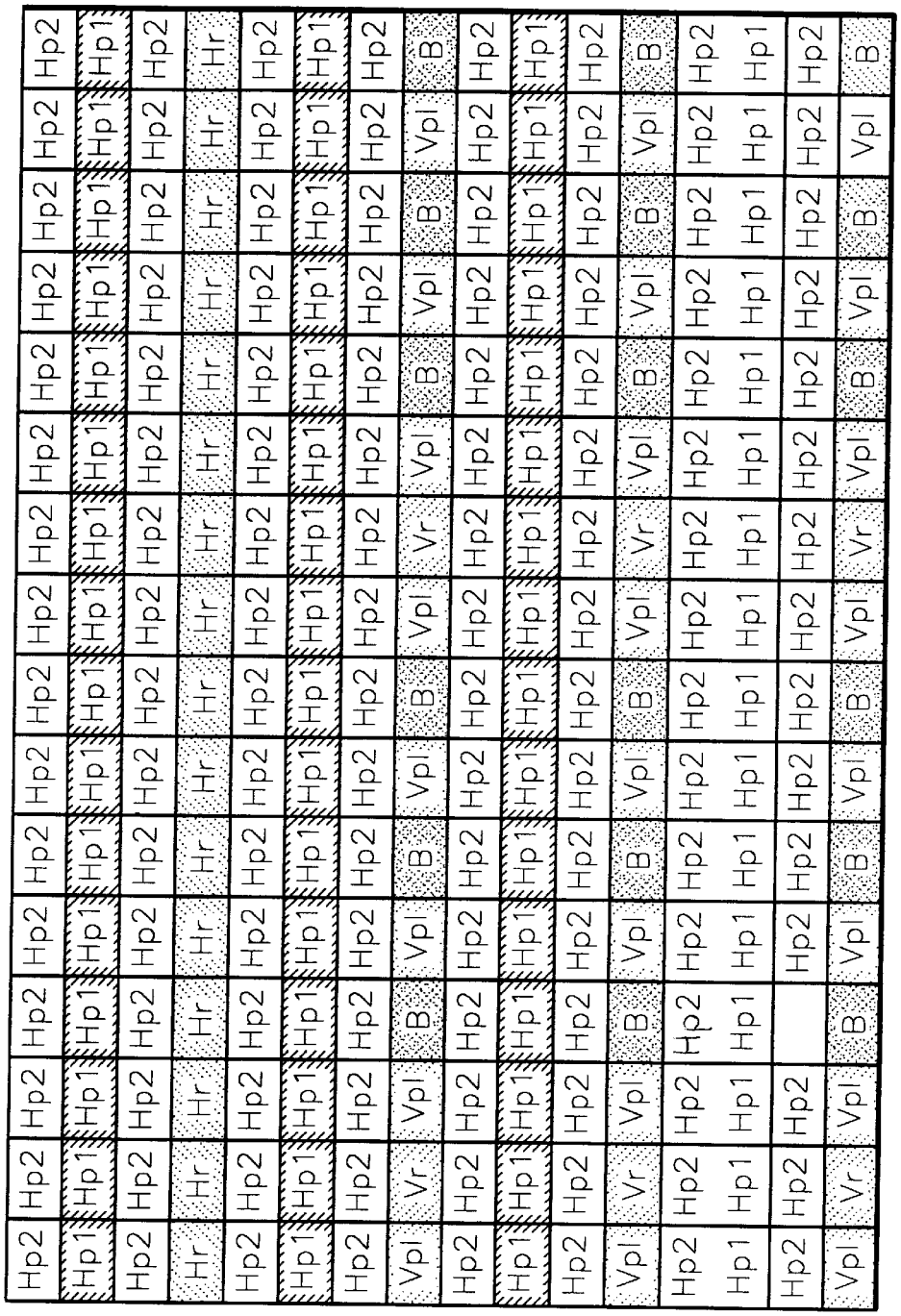
FIG. 4a illustrates a pixel decoding step of a certain block in a decoding process performed by the block.
Figure 4B:
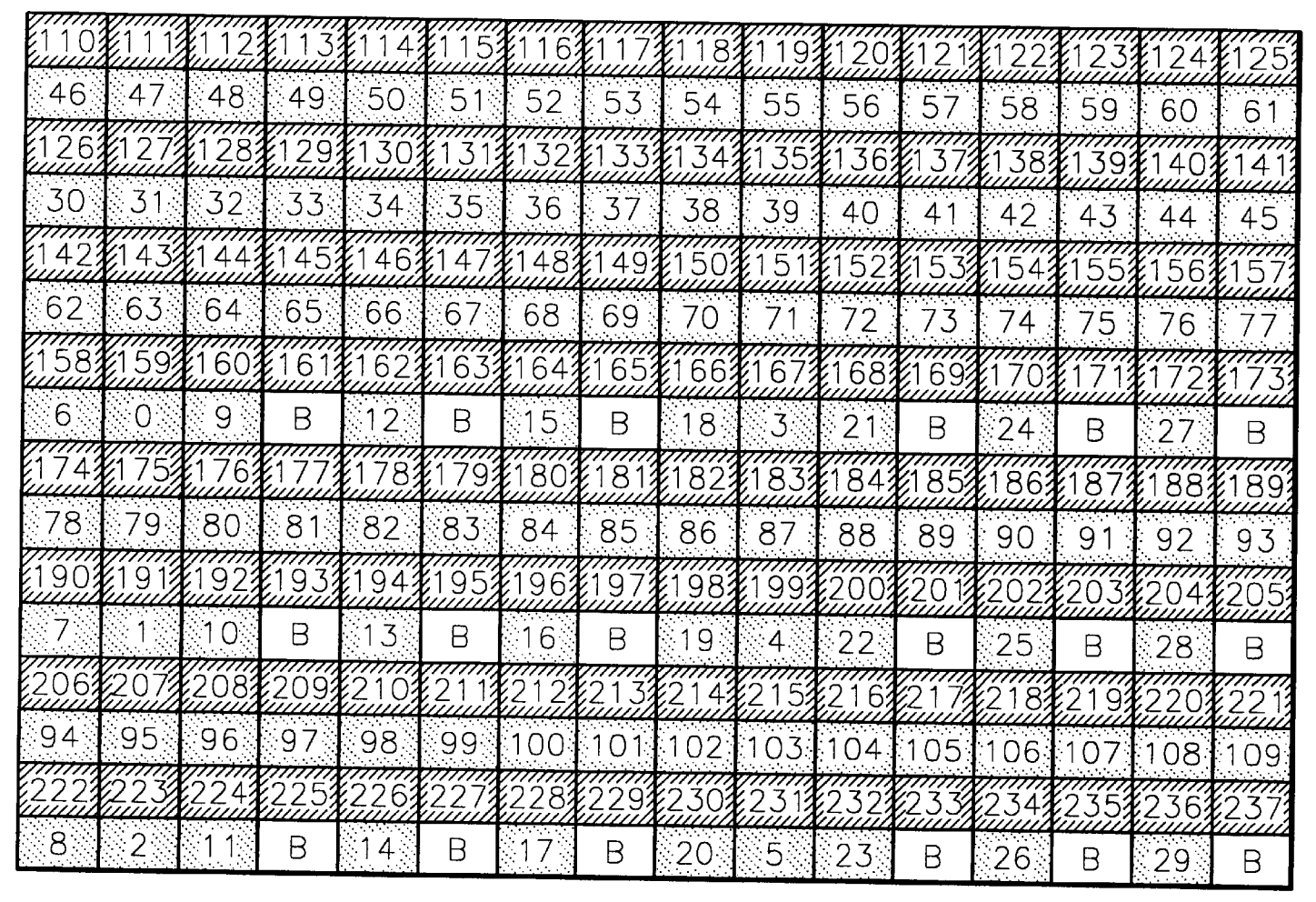

FIG. 4a illustrates a pixel decoding step of a certain block in a decoding process performed in units of a predetermined block when the panels 321 through 326 of FIG. 3 are used in actual restoring in units of a predetermined block. FIG. 4b illustrates the pixel decoding order of a certain block when the horizontal-direction sampling ratio is 3/8, and the vertical-direction sampling ratio is 1/5. For the convenience of description, it is assumed that the size of block is the same as the size of the images in FIGS. 4a and 4b. For spatial restoration performed by the block, the entire spatial resolution, is restored by restoring the pixel value of each block in the order of B→$V_r$→$V_{p1}$→$H_r$→$H_{p1}$→$H_{p2}$.

Figure 5A:
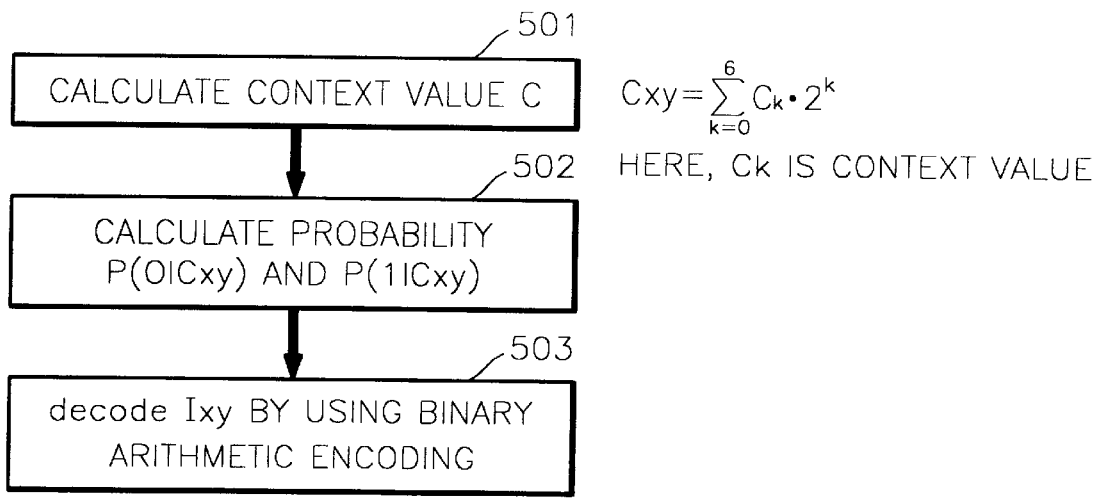
FIGS. 5a through 5c illustrate a method for decoding the pixel value of each pixel in a generalized scan interleaving-based encoding/decoding method using context values of neighboring pixels.
Figure 5B:
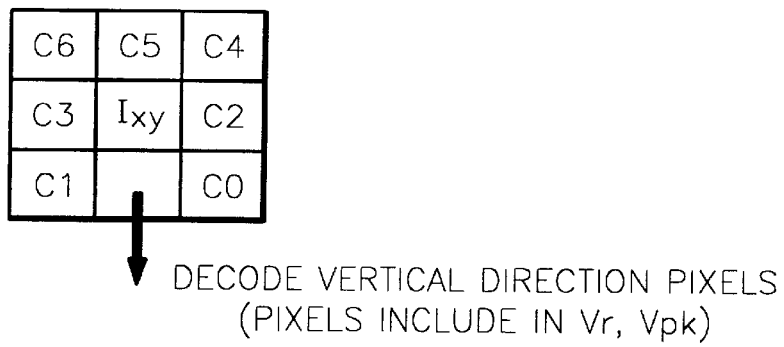
Figure 5C:
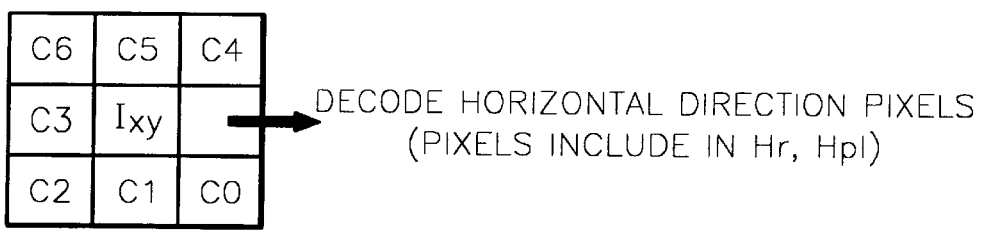

FIGS. 5a through 5c illustrate a method for decoding the pixel value of each pixel when restoring each pixel by using this order.

Referring to FIG. 5a, first, a context value is obtained using information of pixels adjacent to a current pixel to be restored in step 501, probability information on the context value is obtained in step 502, and the current pixel value is decoded in a decoder, which uses a binary arithmetic encoding method, using the thus obtained probability information in step 503. Neighboring pixel information of FIGS. 5b and 5c is used as context values using neighboring pixel information. The information of FIG. 5b is used in decoding pixels corresponding to $V_r$ and $V_{pk}$, while the information of FIG. 5c is used in decoding pixels corresponding to $H_r$ and $H_{p1}$.

In FIG. 5b, C0 through C6 are fully decoded pixel values. C6, C5 and C4 are located immediately above and to the left of a current pixel to be decoded, immediately above the current pixel, and immediately above and to the right of the current pixel, respectively. C3 and C2 are located nearest to and to the left of the current pixel and nearest to and to the right of the current pixel, respectively. C1 and C0 are located immediately below and to the left of the current pixel and immediately below and to the right below of the current pixel.

The probability values of the context values obtained using neighboring pixels of FIG. 5b, that is, the probability values used in decoding in a vertical-direction scanning method are as follows:

enh_intra_v_prob[128]={

65476, 64428, 62211, 63560, 52253, 58271, 38098, 31981, 50087, 41042, 54620, 31532, 8382, 10754, 3844, 6917, 63834, 50444, 50140, 63043, 58093, 45146, 36768, 13351, 17594, 28777, 39830, 38719, 9768, 21447, 12340, 9786, 60461, 41489, 27433, 53893, 47246, 11415, 13754, 24965, 51620, 28011, 11973, 29709, 13878, 22794, 24385, 1558, 57065, 41918, 25259, 55117, 48064, 12960, 19929, 5937, 25730, 22366, 5204, 32865, 3415, 14814, 6634, 1155, 64444, 62907, 56337, 63144, 38112, 56527, 40247, 37088, 60326, 45675, 51248, 15151, 18868, 43723, 14757, 11721, 62436, 50971, 51738, 59767, 49927, 50675, 38182, 24724, 48447, 47316, 56628, 36336, 12264, 25893, 24243, 5358, 58717, 56646, 48302, 60515, 36497, 26959, 43579, 40280, 54092, 20741, 10891, 7504, 8109, 30840, 6772, 4090, 59810, 61410, 53216, 64127, 32344, 12462, 23132, 19270, 32232, 24774, 9615, 17750, 1714, 6539, 3237, 152}

Each of the probability values of the context values is an integer equal to or larger than zero, and less than or equal to 65535, and the number of probability values is $2^7=128$. In enh_intra_v_prob[128], the value (X) which corresponds to the same position as a context value is a probability value for the pixel of the corresponding context value to be "0," and 65535—X is a probability for the pixel of the corresponding context value to be "1." That is, if a context value obtained from FIG. 5b is C, enh_intra_v_prob[C] is a probability for the pixel of the corresponding context value to be "0," and 65535—enh_intra_v—prob[C] is a probability for the pixel of the corresponding context value to be "1."

In FIG. 5c, C0 through C6 are fully decoded pixel values. C6, C5 and C4 are located immediately above and to the left of a current pixel to be decoded, immediately above the current pixel, and immediately above and to the right of the current pixel, respectively. C3 is located nearest to and to the left of the current pixel. C2, C1, and C0 are located immediately below and to the left of the current pixel, immediately below the current pixel, and immediately below and to the right of the current pixel, respectively.

The probability values of the context values obtained using neighboring pixels of FIG. 5c, that is, the probability values used in decoding in a horizontal-direction scanning method are as follows:

enh_intra_h_prob[128]={

65510, 63321, 63851, 62223, 64959, 62202, 63637, 48019, 57072, 33553, 37041, 9527, 53190, 50479, 54232, 12855, 62779, 63980, 49604, 31847, 57591, 64385, 40657, 8402, 33878, 54743, 17873, 8707, 34470, 54322, 16702, 2192, 58325, 48447, 7345, 31317, 45687, 44236, 16685, 24144, 34327, 18724, 10591, 24965, 9247, 7281, 3144, 5921, 59349, 33539, 11447, 5543, 58082, 48995, 35630, 10653, 7123, 15893, 23830, 800, 3491, 15792, 8930, 905, 65209, 63939, 52634, 62194, 64937, 53948, 60081, 46851, 56157, 50930, 35498, 24655, 56331, 59318, 32209, 6872, 59172, 64273, 46724, 41200, 53619, 59022, 37941, 20529, 55026, 52858, 26402, 45073, 57740, 55485, 20533, 6288, 64286, 55438, 16454, 55656, 61175, 45874, 28536, 53762, 58056, 21895, 5482, 39352, 32635, 21633, 2137, 4016, 58490, 14100, 18724, 10461, 53459, 15490, 57992, 15128, 12034, 4340, 6761, 1859, 5794, 6785, 2412, 35}

Each of the probability values of the context values is an integer equal to or larger than zero, and less than or equal to 65535, and the number of probability values is $2^7=128$. In enh_intra_h_prob[128], the value (X) which corresponds to the same position as a context value is a probability value for the pixel of the corresponding context value to be "0," and 65535—X is a probability for the pixel of the corresponding context value to be "1." That is, if a context value obtained from FIG. 5c is C, enh_intra_h_prob[C] is a probability for the pixel of the corresponding context value to be "0," and 65535—enh_intra_h_prob[C] is a probability for the pixel of the corresponding context value to be "1."

According to FIG. 6, the method for decoding block pixels using G-SI according to the present invention is as follows. First, when each block begins to be decoded, ehn_bab_type is decoded in step 601. At this time, a decoded block decoding mode (enh—bab—type) becomes one of the following four modes.

Figure 7:
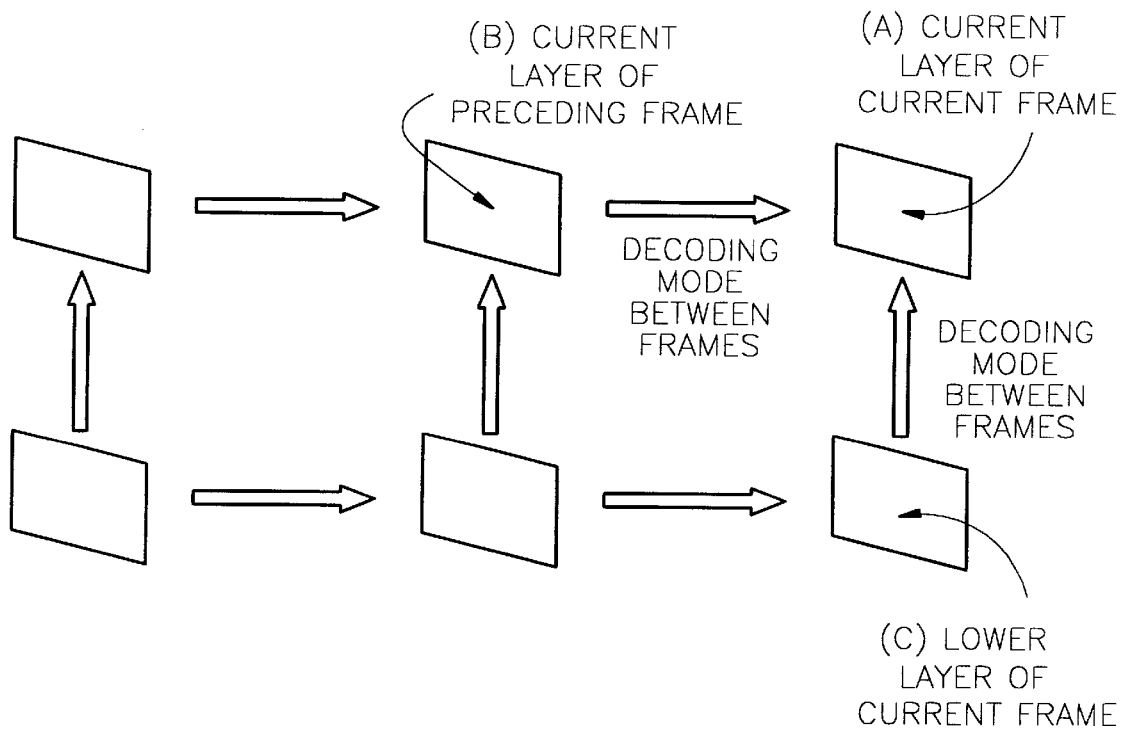
FIG. 7 illustrates relations among a current layer of a current frame, the lower layer of the current frame, and the current layer of a preceding frame in a block decoding method.

When the mode is ehn_bab_type=='0,' that is, ehn_bab_type=="Intra not coded," a current block is restored from the same-location block, which was up-sampled using the up-sampling algorithm of the $1^{st}$ or $2^{nd}$ method, of same-time frame of the base layer in step 602. This mode is used in a P-Video Object Plane (VOP) encoding method and a B-VOP encoding method. Referring to FIG. 7, the B-VOP encoding method uses (B)'s VOP and (C)'s VOP in order to decode (A)'s VOP, and the P-VOP encoding method uses only (C)'s VOP in order to decode (A)'s VOP.

Figure 8:
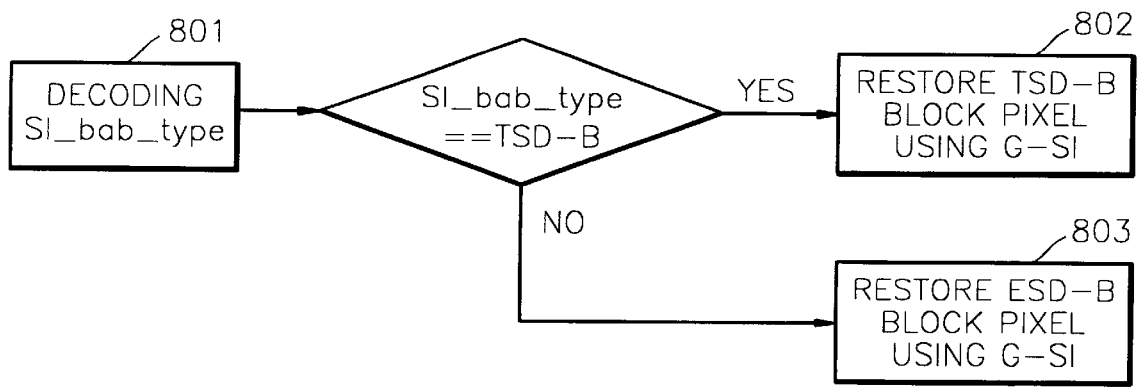
FIG. 8 illustrates a generalized scan interleaving-based decoding process using context values of neighboring pixels.

When the mode is enh—bab—type=='1,' that is ehn_bab_type=="Intra coded," block pixels are decoded by using G-SI according to the present invention. This mode is used in the P-VOP encoding method and the B-VOP encoding method. Referring to FIG. 8, when block pixels are decoded by using G-SI, an SI_bab_type flag is obtained through decoding a binary-arithmetic-encoded code using the probability value Sl—bab—type_prob[1]={59808} before decoding block pixels, and whether the type of current block is Transitional Sample Data Block (TSD-B) or an Exceptional Sample DataBlock (ESD-B) is determined. When the flag indicates TSD-B, only TSD pixels among pixels (excluding pixels (B) which are transferred intact from the base layer) to be decoded are decoded when decoding the current block using bit streams transferred from the encoder, and, Predictive Sample Data (PSD), the remaining pixels, are restored using reference pixel values as they are. When the flag indicates ESD-B, all pixels that were not down-sampled during down-sampling (excluding B) are decoded for decoding the current block using bit streams transferred from the encoder.

Figure 9A:
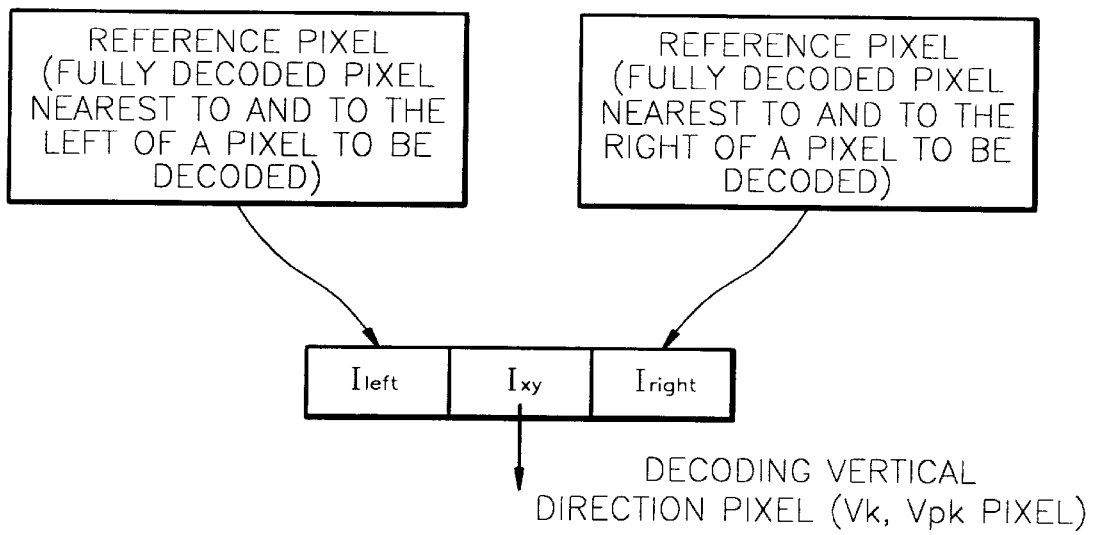
FIG. 9a illustrates a reference pixel in vertical-direction pixel decoding.
Figure 9B:
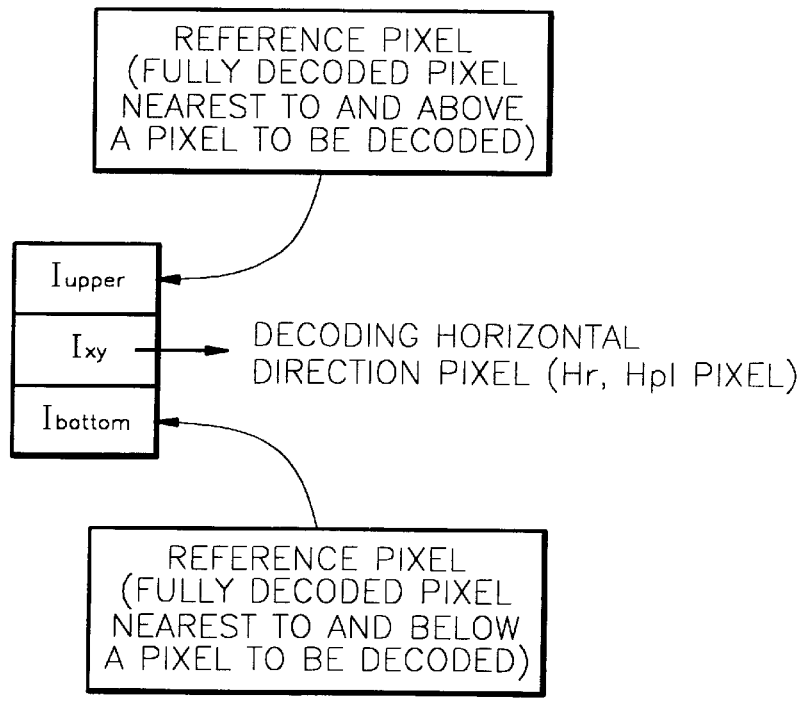
FIG. 9b illustrates a reference pixel in horizontal-direction pixel decoding.

FIG. 9a illustrates a reference pixel in vertical-direction pixel decoding, FIG. 9b illustrates a reference pixel in horizontal-direction pixel decoding, and FIG. 9c illustrates the types of pixels to be decoded, according to the types of reference pixels of FIGS. 9a and 9b.

Table 1 shows a block pixel decoding method using G-SI according to the types of decoded SI_bab_type.

TABLE 1

| Types of SI BAB | Definition | Block pixel restoring method using G-SI |
|---|---|---|
| TSD-B | A block which has no ESD when block pixels to be decoded (all the pixels in the block excluding B which are pixel information of the base layer sampled during down-sampling) are classified according to G-SI data types | <Block pixel restoring method using G-SI> When block pixels to be decoded are classified according to G-SI data types TSD; (when two reference pixel values are different to each other) is decoded from encoded bit streams through the binary arithmetic-using encoder by the method of FIG. 5a PSD: (when two reference pixel values are the same) The reference pixel value is restored to a current pixel value. |

TABLE 1-continued

| Types of SI BAB | Definition | Block pixel restoring method using G-SI |
|---|---|---|
| ESD-B | A block which has one or more ESD when block pixels to be decoded (all the pixels in the block excluding B which are pixel information of the base layer sampled during down-sampling) are classified according to G-SI data types | <ESD-B block pixel restoring method using G-SI> Block pixels to be decoded (all the pixels in the block excluding B which are pixel information of the base layer sampled during down-sampling) are decoded from encoded bit streams through the binary arithmetic encoder. |

When the mode is ehn_bab_type=='2', that is, ehn_bab_type=="Inter not coded", the block motion vector of the same position of the base layer (C) (the block position in the base layer which is obtained by scaling the block position of the current layer in the same ratio that is used for down-sampling the current layer to the base layer), is scaled from the base layer to the current layer in the up-sampling ratio. Using the thus obtained motion vector, a block is obtained through motion compensation in the preceding frame (B) of the current layer. Pixel values of the block as they are are used as the current block pixel values for restoration.

When the mode is ehn_bab_type=='3', that is, ehn_bab_type=="Inter coded", the block motion vector of the same position of the base layer (C) is scaled from the base layer to the current layer in the up-sampling ratio. Using thus obtained motion vector, a block is obtained through motion compensation in the preceding frame (B) of the current layer. Using decoding of INTER-CAE method which uses the block as a reference block for inter coding, the current block is restored. This mode is used in the B-VOP method.

Figure 6:
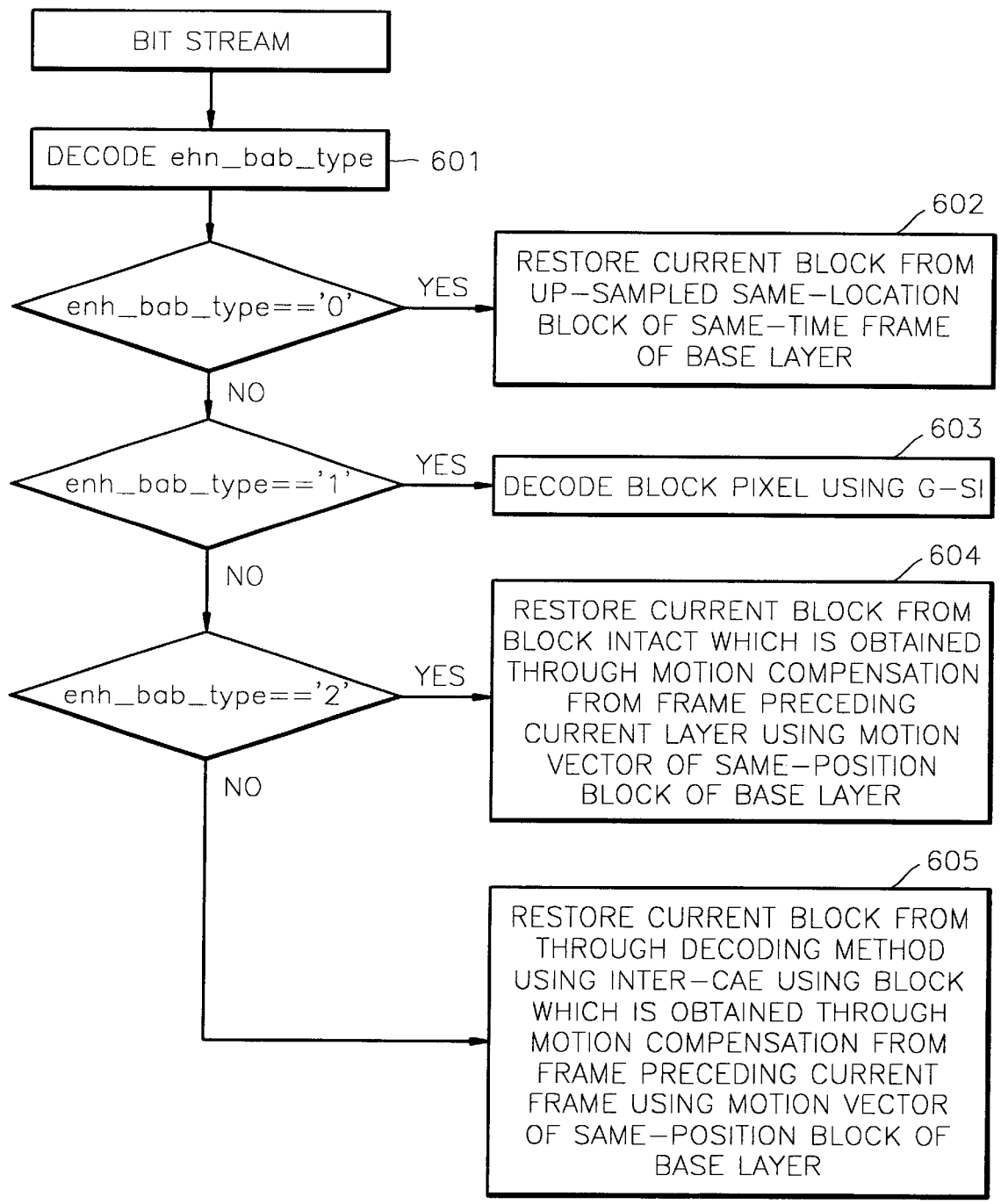
FIG. 6 is a flowchart showing a scalable binary shape decoding process using a generalized scan interleaving-based encoding/decoding method using context values of neighboring pixels.
Figure 10:
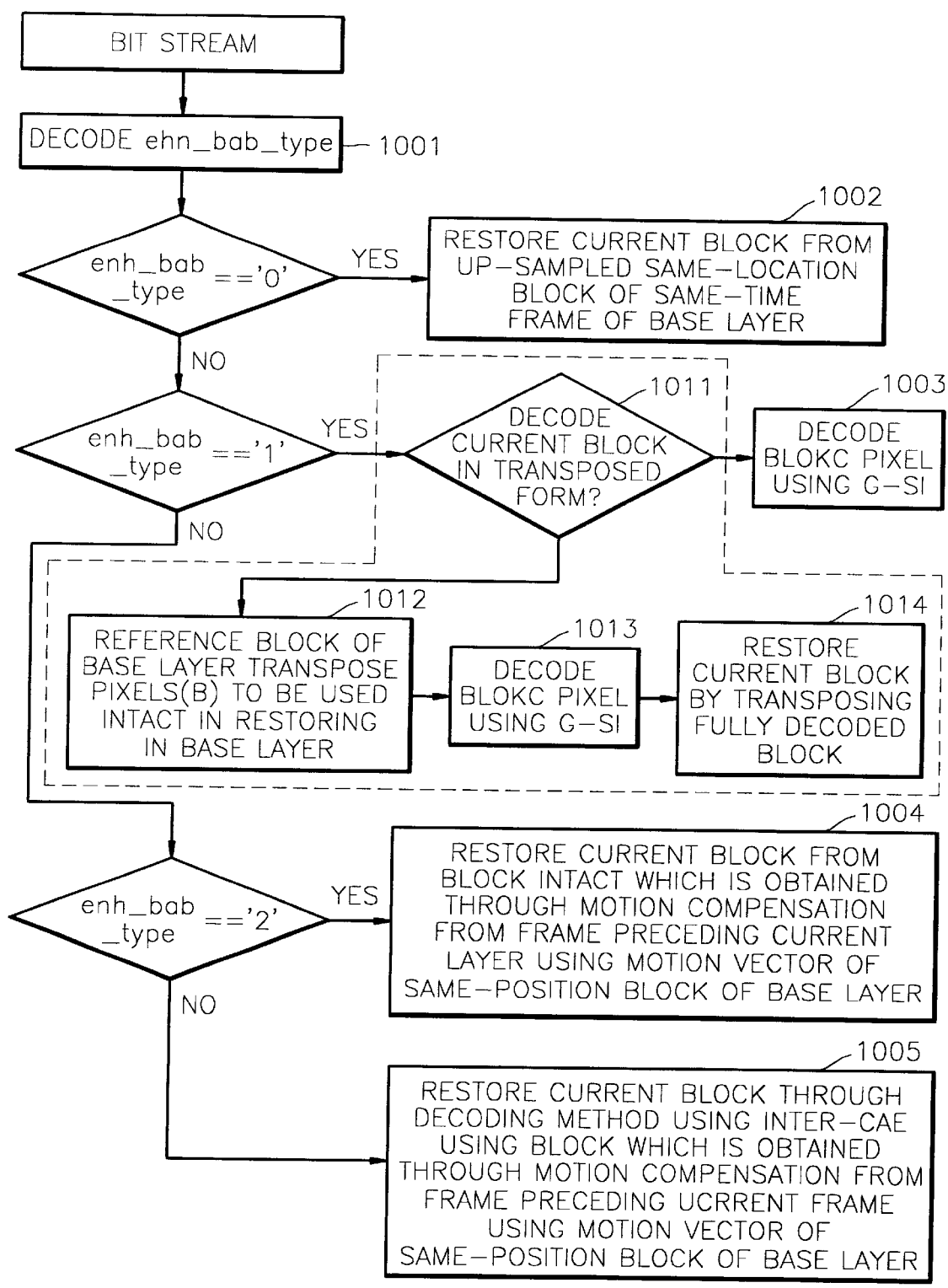
FIG. 10 illustrates a flowchart in which a process for decoding transposed blocks are added to the scalable binary shape decoding process of FIG. 6.

When the mode is enh—bab—type==intra_code in the decoding method of FIG. 6, a decision in decoding blocks to be decoded can be made, right before decoding of block pixels using G-SI, on whether to restore a block by decoding it to the same form as the original block or to restore the original block by again transposing the decoded block after decoding a transposed form of the original in steps 1011 through 1014. This process is illustrated in FIG. 10. In FIG. 10, steps 1001 through 1005 are the same as the steps 601 through 605 of FIG. 6. The decision on whether to transpose or not can be made for all cases, or can be made only for when the sampling ratio between the current layer and the base layer is half of the width, and half length.

The present invention allows encoding/decoding of a current layer using a lower layer which is continuously scalable, thus removing the limitation of a conventional binary shape information encoder suing scan interleaving (hereinafter referred to as SI), in which only a lower layer which is half the width and half the length of the current layer must be used.

Therefore, scalable shape encoding/decoding apparatus which can be applied to more diverse application fields can be implemented according to the present invention.

What is claimed is:

1. A generalized scan interleaving-based encoding method using context values of neighboring pixels, for encoding pixels which were not sampled during down-sampling, after down-sampling pixels of a current layer in the sampling ratio of m/n in the vertical direction and m'/n' in the horizontal direction when input shape information are pixels of the current layer, wherein m, n and m', n' are arbitrary integers (zero is forbidden), and m<=n and m'<=n', the scan interleaving-based method comprising the steps of:

(a) forming a bit stream of a base layer by encoding, through a predetermined encoding method, the base layer pixels which were down-sampled from the current layer pixels through $2^K$ down-sampling and residual down-sampling in the vertical direction and the horizontal direction, respectively, wherein the exponent K satisfies K=0, 1, 2, . . . ;

(b) dividing the current layer pixels into units of a predetermined block;

(c) forming bit streams for all blocks of the current layer, by sequentially carrying out forming steps for pixels forming each block of the current layer, the forming steps comprising the steps of:

(c1) encoding pixels, which were not sampled when vertical-direction $2^L$ down-sampling was L-times recursively carried out in the step (a), using context values of neighboring pixels, wherein L is the largest integer less than or equal to $\log_2(n/m)$;

(c2) encoding pixels, which were not sampled during residual down-sampling in the ratio of $[(m2^2)/n]$ in the vertical direction, using context values of neighboring pixels;

(c3) encoding pixels, which were not sampled when horizontal-direction $2^K$ down-sampling was K-times recursively carried out in the step (a), using context values of neighboring pixels, wherein K is the largest integer less than or equal to $\log_2(n'/m')$;

(c4) encoding pixels, which were not sampled during residual down-sampling in the ratio of $[(m'2^K)/n']$ in the horizontal direction in the step (a), using context values of neighboring pixels; and (c5) forming blocks of encoded bit streams by the block by arraying the bit streams encoded in the steps (c1), (c2), (c3), and (c4) in the order of steps (c4), (c3), (c2) and (c1); and (D) forming scalable bit streams by arraying bit streams of the current layer after the bit streams of the base layer.

2. The scan interleaving-based encoding method of claim 1, wherein the vertical-direction $2^L$ down-sampling is for sampling even numbered lines in the lines of pixels; the horizontal-direction $2^K$ down-sampling is for sampling even numbered columns in the columns of pixels; the residual down-sampling in the ratio of $[(m2^L)/n]$ in the vertical direction is for sampling $m2^L$ lines of n lines of pixels so that lines which are not sampled are allocated evenly and after the lines the sampled lines are located; and the residual down-sampling in the ratio of $[(m'2^K)/n']$ in the horizontal direction is for sampling $m'2^K$ columns of every n' columns of pixels so that columns which are not sampled are allocated evenly and after the columns the sampled columns are located.

3. The scan interleaving-based encoding method of claim 1, wherein the vertical-direction $2^L$ down-sampling is for sampling odd numbered lines in the lines of pixels; the horizontal-direction $2^K$ down-sampling is for sampling odd numbered columns in the columns of pixels; the residual down-sampling in the ratio of $[(m2^L)/n]$ in the vertical direction is for sampling $m2^L$ lines of every n lines of pixels so that lines which are not sampled are allocated evenly and before the lines the sampled lines are located; and the residual down-sampling in the ratio of $[(m'2^K)/n']$ in horizontal direction is to sample $m'2^K$ columns per n' columns in the columns of pixels so that columns which are not sampled are allocated evenly and before the columns sampled columns are located.

4. The scan interleaving-based encoding method of claim 1, before the step (c1), further comprising a step of performing binary arithmetic encoding of block encoding types after determining the block encoding types by determining an Exceptional Sample Data Block (ESD-B) wherein, in pixel encoding through horizontal-direction scanning for each pixel to be decoded, excluding pixels of the base layer, in pixels forming the blocks, there exist one or more exceptional pixels that is not the same as one of a reference pixel which is located nearest to and above the current pixel to be decoded and a reference pixel which is located nearest to and below the current pixel when the reference pixels are the same, or, in pixel encoding through vertical-direction scanning, there exists one or more pixels that is not the same as one of a reference pixel which located nearest to and to the left of the current pixel and a reference pixel which is located nearest to and to the right of the current pixel when the reference pixels are the same, or otherwise determining the Transitional Sample Data Block (TSD-B), wherein the binary arithmetic encoded block encoding type is located in the front of the bit stream encoded by the block formed in the step (c5).

5. The scan interleaving-based encoding method of claim 4, wherein the generalized scan interleaving-based encoding using context values of neighboring pixels is for performing arithmetic encoding of all pixels to be decoded in the block using neighboring pixels if the block encoding type is an exceptional block (ESD-B); and if the block encoding type is a transitional block (TSD-B), the generalized scan interleaving-based encoding using context values of neighboring pixels is not encoding Predictive Sample Data (PSD) pixels, each of which, in pixel encoding through horizontal direction generalized scanning for each pixel to be decoded in the block, is the same as both a reference pixel which is located nearest to and above the current pixel to be decoded and a reference pixel which is located nearest to and below the current pixel when the reference pixels are the same, or; each of which, in pixel encoding through vertical direction generalized scanning for each pixel to be decoded in the block, is the same as both a reference pixel which is located nearest to and to the left of the current pixel and a reference pixel which is located nearest to and to the right of the current pixel when the reference pixels are the same, and, for otherwise pixels, that is, TSD pixels, the generalized scan interleaving-based encoding is to perform arithmetic encoding of TSD pixels using neighboring pixels.

6. The generalized scan interleaving-based encoding method of claim 5, wherein the arithmetic encoding using neighboring pixels is for performing arithmetic encoding of probability values corresponding to context values after obtaining context values by using neighboring pixels which are already encoded, including, in pixel encoding through vertical-direction generalized scanning, a pixel which is located immediately above and to the left of a current pixel to be encoded, a pixel which is located immediately above of the current pixel, a pixel which is located immediately above and to the right of the current pixel, a pixel which is located immediately to the left of the current pixel, a pixel which is located immediately to the right of the current pixel, a pixel which is located immediately below and to the left of the current pixel, and a pixel which is located immediately below and to the right of the current pixel, or, including, in pixel encoding through horizontal direction generalized scanning, a pixel which is located immediately above and to the left of a current pixel to be encoded, a pixel which is located immediately above the current pixel, a pixel which is located immediately above and to the right of the current pixel, a pixel which is located immediately to the left of the current pixel, a pixel which is located immediately below and to the left of the current pixel, a pixel which is located immediately below the current pixel, and a pixel which is located immediately below and to the right of the current pixel.

7. The generalized scan interleaving encoding method of claim 1, wherein the method of claim 1 is recursively used in a predetermined method for encoding the base layer pixels in the step (a).

8. A generalized scan interleaving-based decoding method using context values of neighboring pixels, the generalized scan interleaving-based decoding method using bit streams of a base layer which is obtained by encoding the base layer obtained by down-sampling pixels of the current layer in the sampling ratio of m/n in the vertical direction and m'/n' in the horizontal direction, and bit streams of the current layer which is obtained by encoding pixels, not sampled during down-sampling, in units of a block, when input shape information are pixels of the current layer, wherein m, n, m', N' are arbitrary integers (zero is forbidden), and m<=n, m'<=n', the generalized scan interleaving-based method comprising the steps of:

(a) decoding the base layer pixels by a predetermined method which uses the base layer bit streams;

(b) performing horizontal-direction residual up-sampling, horizontal-direction $2^K$ up-sampling, vertical-direction residual up-sampling, and vertical-direction $2^L$ up-sampling of the base layer pixels in the step (a) in order for the base layer pixels to have the same spatial resolution as the current layer, wherein the exponent K and L satisfy K=0, 1, 2, . . . , and L=0, 1, 2, . . . ;

(c) dividing the current layer pixels up-sampled in the step (b) into units of a predetermined block; and (d) decoding all blocks of the current layer each block is decoded, by sequentially carrying out decoding steps which comprises:

(d1) decoding in the current block pixels interpolated during horizontal-direction residual up-sampling in the ratio of $[n'/m'2^K)]$ by applying generalized scan interleaving-based decoding using context values of neighboring pixels to the current layer bit streams corresponding to the block, wherein K is the largest integer less than or equal to $\log_2(n'/m')$;

(d2) decoding pixels, which were interpolated when horizontal-direction $2^K$ up-sampling was K-times recursively carried out, by K times recursively applying generalized scan interleaving-based decoding using context values of neighboring pixels by the block to the current layer bit streams corresponding to the block;

(d3) decoding the current block pixels interpolated during vertical-direction residual up-sampling in the ratio of $[n/(m2^L)]$ by applying generalized scan interleaving-based decoding using context values of neighboring pixels to the current layer bit streams corresponding to the block, wherein L is the largest integer less than or equal to $\log_2(n/m)$; and (d4) decoding pixels, which were interpolated when vertical-direction $2^L$ up-sampling was L-times recursively carried out, by L times recursively applying generalized scan interleaving-based decoding using context values of neighboring pixels by the block to the current layer bit streams corresponding to the block.

9. The generalized scan interleaving-based decoding method of claim 8, wherein the vertical-direction residual up-sampling in the ratio of $[n/(m2^L)]$ is for interpolating one line for every $(m2^L)/(n-m2^L)$th line so that interpolated lines are allocated evenly and located before existing lines; the horizontal-direction residual up-sampling in the ratio of $[n'/(m'2^K)]$ is for interpolating one column for every $(m2^K)/(n-m2^K)$th column so that interpolated columns are allocated evenly and located before existing columns; the vertical-direction $2^L$ up-sampling is for interpolating one line before each line of pixels; and the horizontal-direction $2^K$ up-sampling is for interpolating one column before each column of pixels.

10. The generalized scan interleaving-based decoding method of claim 8, wherein the vertical-direction residual up-sampling in the ratio of $[n/(m2^L)]$ is for interpolating one line for every $(m2^L)/(n-m2^L)$th line so that interpolated lines are allocated evenly and located after existing lines; the horizontal-direction residual up-sampling in the ratio of $[n'/(m'2^K)]$ is for interpolating one column for every $(m2^K)/(n-m2^K)$th column so that interpolated columns are allocated evenly and located after existing columns; the vertical-direction $2^L$ up-sampling is for interpolating one line after each line of pixels; and the horizontal-direction $2^K$ up-sampling is for interpolating one column after each column of pixels.

11. The generalized scan interleaving-based decoding method of claim 8, further comprising a step for performing binary arithmetic decoding of block encoding types which represent an Exceptional Sample Data Block (ESD-B) wherein, in pixel decoding through horizontal-direction generalized scanning for each pixel to be decoded, excluding pixels of the base layer, in pixels forming the block, there exist one or more exceptional pixels that is not the same as one of a reference pixel which is located immediately above the current pixel to be decoded and a reference pixel which is located immediately below the current pixel when the reference pixels are the same, or in pixel decoding through vertical-direction generalized scanning, there exists one or more pixels that is not the same as one of a reference pixel which is located immediately to the left of the current pixel and a reference pixel which is located immediately to the right of the current pixel when the reference pixels are the same, and Transitional Sample Data Block (TSD-B) for otherwise blocks.

12. The generalized scan interleaving-based decoding method of claim 11, wherein the generalized scan interleaving-based decoding using context values of neighboring pixels is for performing arithmetic decoding of all pixels to be decoded in the block using neighboring pixels if the block encoding type is ESD-B; and if the block encoding type is TSD-B, the generalized scan interleaving-based decoding using context values of neighboring pixels is to restore pixels to be decoded to the same values to reference values for Predictive Sample Data (PSD) pixels, each of which, in pixel decoding through horizontal-direction generalized scanning for each pixel to be decoded in the block, is the same as both a reference pixel which is located immediately above the current pixel to be decoded and a reference pixel which is located immediately below the current pixel when the reference pixels are the same, or, each of which, in pixel decoding through vertical-direction generalized scanning for each pixel to be decoded in the block, is the same as both a reference pixel which is located immediately to the left of the current pixel and a reference pixel which is located immediately to the right of the current pixel when the reference pixels are the same, and, for otherwise pixels, that is, TSD pixels, the generalized scan interleaving-based decoding is to perform arithmetic decoding using neighboring pixels.

13. The generalized scan interleaving-based decoding method of claim 12, wherein the arithmetic decoding using neighboring pixels is for performing arithmetic decoding by obtaining probability values corresponding to context values after obtaining context values by using neighboring pixels which are already decoded, including, in pixel decoding through vertical-direction generalized scanning, a pixel which is located immediately above and to the left of a current pixel to be decoded, a pixel which is located immediately above of the current pixel, a pixel which is located immediately above and to the right of the current pixel, a pixel which is located immediately to the left of the current pixel, a pixel which is located immediately to the right of the current pixel, a pixel which is located immediately below and to the left of the current pixel, and a pixel which is located immediately below and to the right of the current pixel, or, including, in pixel decoding through horizontal-direction generalized scanning, a pixel which is located immediately above and to the left of a current pixel to be decoded, a pixel which is located immediately above of the current pixel, a pixel which is located immediately above and to the right above of the current pixel, a pixel which is located immediately to the left of the current pixel, a pixel which is located immediately below and to the left of the current pixel, a pixel which is located immediately below of the current pixel, and a pixel which is located immediately below and to the right below of the current pixel.

14. The generalized scan interleaving-based decoding method of claim 8, wherein the decoded current layer is used as a base layer in the step (a) and steps (b) through (c) are recursively performed.

15. A generalized scan interleaving-based encoding apparatus using generalized context values of neighboring pixels, for encoding pixel, which were not sampled during down-sampling for obtaining a base layer, among pixels of blocks which are prepared by dividing a current layer into a plurality of blocks in encoding of a current layer, after down-sampling pixels of the current layer in the sampling ratio of m/n in the vertical direction and m'/n' in the horizontal direction when input shape information are pixels of the current layer, wherein m, n, m', n' are arbitrary integers (zero is forbidden), and m<=n, m'<=n', the generalized scan interleaving-based encoding method comprising:

down-sampling means for performing vertical-direction $2^K$ down-sampling, vertical-direction residual down-sampling, horizontal-direction $2^K$ down-sampling and horizontal-direction residual down-sampling of the current layer pixels, wherein the exponent K satisfies K=0, 1, 2, . . . ;

encoding means for encoding the base layer pixels down-sampled in the down-sampling means;

a block-dividing unit for dividing the current layer pixels into units of a predetermined block;

vertical-direction $2^L$ encoding means for receiving divided blocks from the block-dividing unit, and performing generalized scan interleaving-based encoding of pixel, which were not sampled when vertical-direction $2^L$ down-sampling processes L-times recursively carried out in the down-sampling means, among received block pixels, using context values of neighboring pixels, wherein L is the largest integer less than or equal to $\log_2(n/m)$;

vertical-direction residual encoding means for receiving divided blocks from the block-dividing unit, and performing generalized scan interleaving-based encoding of pixels, which were not sampled during residual down-sampling in the ratio of $[(m2^L)/n]$ in the vertical direction in the down-sampling means, among received block pixels, using context values of neighboring pixels;

horizontal-direction $2^K$ encoding means for receiving divided blocks from the block-dividing unit, and performing generalized scan interleaving-based encoding of pixel, which were not sampled when horizontal-direction $2^K$ down-sampling is K-times recursively carried out in the down-sampling means, among received block pixels, using context values of neighboring pixels, wherein K is the largest integer less than or equal to $\log_2(n'/m')$;

horizontal-direction residual encoding means for receiving divided blocks from the block-dividing unit, and performing generalized scan interleaving-based encoding of pixel, which were not sampled during residual down-sampling in the ratio of $[(m'2^K)/n']$ in the horizontal direction in the down-sampling means, among received block pixels, using context values of neighboring pixels; and a multiplexing unit for forming bit streams of the base layer after receiving bit streams from the base layer encoding means; forming bits streams in order of the horizontal-direction residual encoding means, the horizontal-direction $2^K$ encoding means, the vertical-direction residual encoding manes, and the vertical-direction $2^L$ encoding means; forming bit streams of the current layer after receiving unit block bit streams as much as the number of blocks; and connecting the current bit streams to the back of the base layer bit streams and transferring the bit streams.

16. A generalized scan interleaving-based decoding apparatus using generalized context values of neighboring pixels, for decoding pixel which were not sampled during down-sampling for obtaining a base layer, among pixels of block which are prepared by dividing a current layer into a plurality of blocks in encoding of a current layer, after down-sampling pixels of the current layer in the sampling ratio of m/n in the vertical direction and m'/n' in the horizontal direction when input shape information are pixels of the current layer, wherein m, n, m', n' are arbitrary integers (zero is forbidden), and m<=n, m'<=n', comprising:

base layer decoding means for decoding the base layer pixels by using the base layer bit streams;

up-sampling means for performing horizontal-direction residual up-sampling, horizontal-direction $2^K$ up-sampling, vertical-direction residual up-sampling, and vertical-direction $2^L$ up-sampling in order to provide base layer pixels with the same spatial resolution as the current layer, wherein the exponent K satisfies K=0, 1, 2, . . . and L satisfies L=0, 1, 2, . . . ;

horizontal-direction residual decoding means for locating values decoded through generalized scan interleaving using the current layer bit streams and context values of neighboring pixels in the place where interpolated pixels are located, when horizontal-direction residual up-sampling of the base layer pixels is carried out in the ratio of $[n'/(m'2^K)]$, wherein K is the largest integer less than or equal to $\log_2(n'/m')$;

horizontal-direction $2^K$ decoding means for locating values decoded through generalized scan interleaving using the current layer bit steams and context values of neighboring pixels on the place where interpolated pixels are located, when horizontal-direction $2^K$ up-sampling of the base layer pixels which were residual up-sampling in the horizontal direction is carried out K times recursively;

vertical-direction residual decoding means for locating values decoded, through generalized scan interleaving using the current layer bit streams and context values of neighboring pixels in the place where interpolated pixels are located, when $[n/(m2^L)]$ times vertical-direction residual up-sampling of the base layer pixels which were $2^K$ up-sampled in horizontal direction is carried out, wherein L is the largest integer less than or equal to $\log_2(n/m)$; and vertical-direction $2^L$ decoding means for locating values decoded through generalized scan interleaving using the current layer bit streams and context values of neighboring pixels on the place where interpolated pixels are located when vertical-direction $2^L$ up-sampling of the base layer pixels which were residual up-sampling in vertical direction is carried out L times recursively.

\* \* \* \* \*